United States Patent [19]

Bullmer et al.

[11] Patent Number: 5,462,501

[45] Date of Patent: Oct. 31, 1995

[54] METHOD OF ACTUATING AN AUTOMATIC TRANSMISSION

[75] Inventors: Wolfgang Bullmer, Bietigheim-Bissingen; Klemens Kronenberg, Korntal-Münchingen; Herbert Ott, Grosselfingen, all of Germany

[73] Assignee: Robert Bosch GmbH, Stuttgart, Germany

[21] Appl. No.: 225,547

[22] Filed: Apr. 11, 1994

[30] Foreign Application Priority Data

Apr. 10, 1993 [DE] Germany ............. 43 11 921.2

[51] Int. Cl.⁶ .................................. F16H 59/74
[52] U.S. Cl. ............................... 477/155; 475/125
[58] Field of Search ................ 477/155, 156; 475/125

[56] References Cited

U.S. PATENT DOCUMENTS 3,882,740  5/1975  Forster et al. .................. 475/125

*Primary Examiner*—Dirk Wright
*Attorney, Agent, or Firm*—Walter Ottesen

[57] ABSTRACT

The invention is directed to a method for adjusting the hydraulic pressure actuating at least one clutch of an automatic transmission. The hydraulic pressure is pregiven only by one pressure controller and the automatic transmission coacts with the motor which is especially a drive motor of a motor vehicle. The pressure supplied by the pressure controller is determined in dependence upon the trace of a pregiven motor desired torque.

23 Claims, 4 Drawing Sheets

METHOD OF ACTUATING AN AUTOMATIC TRANSMISSION

FIELD OF THE INVENTION

The invention relates to a method for adjusting a hydraulic pressure actuating at least one clutch of an automatic transmission during a gear change. The hydraulic pressure is pregiven by only one pressure controller and the automatic transmission coacts with a motor such as a drive motor of a motor vehicle.

BACKGROUND OF THE INVENTION

In conventional automatic shift transmissions, a drop of the drive torque usually takes place, for example, when upshifting, which can lead to a jolt affecting comfort. In order to mitigate this jolt, the motor torque can be influenced during shift operation in a suitable manner, for example, by changing the ignition angle or the like.

U.S. patent application Ser. No. 08/050,085, filed Apr. 28, 1993, incorporated herein by reference, discloses that the output torque can be held at the same value by a targeted control of the motor torque before and after the shift operation insofar as the driver command does not change during shifting. The output torque (torque at the transmission output) and therefore the tractive force on the drive wheels is so controlled that it is independent of the gear into which shifting has just taken place within wide limits or is independent of the state of a converter bridging clutch. This method is known in this area of technology under the trade name "mastershift". With the aid of this known control function, the shift point of the transmission can be set in the optimal range for use without experiencing loss as to the sportiness and the meterability of traction force. The known control function relates, however, only to the control of the output torque outside of the shift operations. The motor torque trace during the shift operation leads to a drop in the output torque which reduces comfort during shifting.

SUMMARY OF THE INVENTION

It is an object of the invention to provide a method which affords the advantage of improved comfort during shifting for automatic transmissions which have only a pressure controller for influencing the hydraulic pressure (modulation pressure). Parameters supplied to a transmission control apparatus generate an electrical current driving the pressure controller. The pressure controller converts the current into a corresponding hydraulic pressure which actuates the clutch of the automatic transmission. To improve the gear-shifting comfort of the automatic transmission, the pressure supplied by the pressure controller is determined in dependence upon the trace of a pregiven motor desired torque. According to the invention, the trace of the pregiven motor desired torque acts on the pressure and therefore on the actuation of the clutch of the automatic transmission. It is important that the influence does not take place because of the motor actual torque but rather from the motor desired torque during shifting. The motor desired torque is formed in dependence upon selected operating parameters of the drive/transmission train.

According to another feature of the invention, the pressure supplied by the pressure controller is determined in dependence upon several operating parameters of the drive/transmission train for the adjustment of the clutch torque of the clutch. One parameter is a torque parameter and, more specifically, the motor desired torque.

It is especially preferred to compute the motor desired torque for various time intervals according to various criteria during upshifting and/or during downshifting of the transmission. This leads to a corresponding varying motor torque desired input which, according to the invention, operates on the adjustment of the clutch and therefore on the force transmission of the clutch.

For upshifting, the following time intervals are distinguished: a first time interval starts upon receiving the shift command and ends at a time point at which the motor rpm has not yet dropped. The motor rpm is here the actual motor rpm.

A second time interval of the upshifting follows the first time interval and ends at a time point at which the motor rpm starts to drop.

A third time interval follows immediately after the second time interval and ends at a time point at which the drop of the motor rpm ends; that is, the motor rpm of the new gear is present.

A fourth time interval continues immediately thereafter for the upshifting which begins at the time point at which the clutch has reached its synchronous rpm in the new gear. The upshifting operation is thereby concluded.

In the first time interval of the upshifting, the motor desired torque is determined in dependence upon the following: an output torque of the automatic transmission, a transmission ratio in the old gear and a particularly determined converter amplification of a torque converter of the automatic transmission. The output torque is pregiven by an operator such as the driver of the motor vehicle via the positioning of the accelerator pedal.

In the second interval of the upshifting, the motor desired torque is determined in dependence upon a motor desired torque in the old gear as well as a motor desired torque in the new gear and a time-dependent function.

In the third time interval of the upshifting, the motor desired torque is determined in dependence upon the following: the motor desired torque in the new gear, a moment of inertia of the motor and a time-dependent function. This time-dependent function is preferably selected in such a manner that the magnitude of the moment of inertia can be reduced approximately to the value zero.

In the fourth time interval of the upshifting, the motor desired torque is determined in dependence upon the following: the output torque, the newly selected gear and the mentioned converter amplification which is to be determined in each case.

According to another feature of the invention, the following time intervals are distinguished during downshifting.

A fifth time interval starts at the time point at which the shift command takes place. This time interval ends at the time point at which the motor rpm has already increased. This time point is preferably present when the motor rpm has reached a value which corresponds to the difference of the synchronous rpm of the transmission in the new gear and a characteristic field motor rpm or a characteristic field turbine rpm fixed in a characteristic field.

A sixth time interval follows directly after the fifth time interval of the downshifting. The sixth time interval ends at a time point at which the clutch has reached its synchronous rpm in the new gear.

A seventh time interval is provided for the downshifting and follows the sixth time interval.

In the fifth time interval for the downshifting, the motor desired torque is determined in dependence upon the motor desired torque in the old gear as well as on a time function. This time function is preferably selected in such a manner that the magnitude of the motor desired torque in the old gear can be reduced to the value zero.

In the sixth time interval, the motor desired torque for the downshifting is determined in dependence upon the motor desired torque in the new gear and a further time function. This time function is so selected that the magnitude of the motor desired torque in the new gear can be reduced to the value zero.

Finally, the motor desired torque is determined for downshifting in the seventh time interval in dependence upon the following: the output torque, the transmission ratio in the new gear and the converter amplification present in each case.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
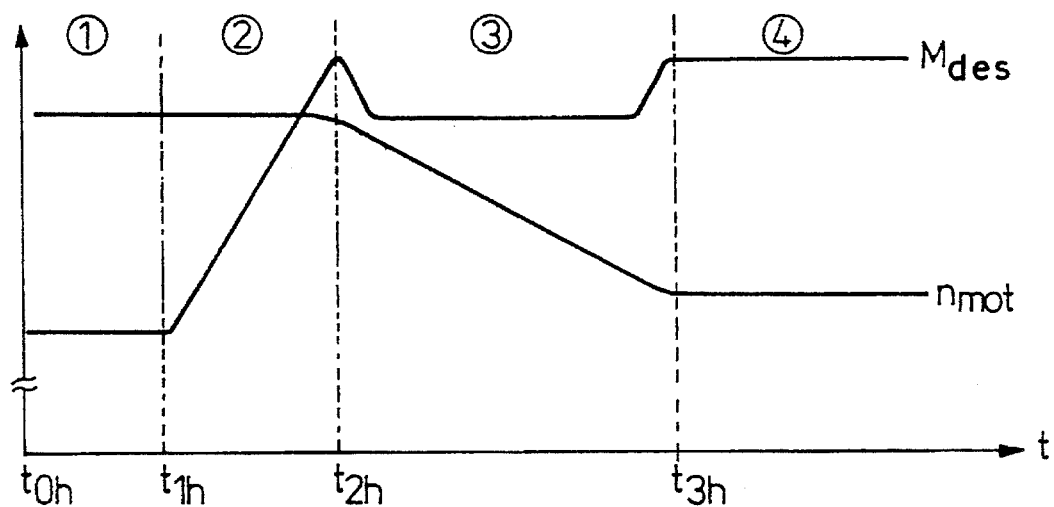
FIG. 1 is a diagram of the time-dependent trace of the motor desired torque and the motor rpm when upshifting.

FIG. 1 shows several phases in which the motor desired torque $M_{des}$ is computed pursuant to different criteria. The motor desired torque $M_{des}$ operates according to the invention on the adjustment of at least one clutch of an automatic transmission. The motor desired torque $M_{des}$ is one parameter of a number of parameters which influence a pressure controller so that the hydraulic pressure supplied by the pressure regulator exhibits a component dependent upon the computed motor desired torque. The hydraulic pressure controls the clutch whereby, in a corresponding manner, a shift operation (upshift and/or downshift) of the automatic transmission is influenced to improve shift comfort.

In FIG. 1, a first time interval is identified by reference numeral 1 and begins at a time point $t_{0h}$. The time point $t_{0h}$ is characterized by the receipt of the shift command. The first time interval 1 ends at time point $t_{1h}$. This time point $t_{1h}$ is defined in that the motor rpm $n_{mot}$ has not yet dropped in this interval. In the first time interval 1, the upshift of the motor desired torque $M_{des}$ is characterized by the relationship:

$$M_{des} = \frac{M_{ab}}{I_{old} \cdot Wv}$$

wherein: $M_{ab}$ characterizes an output torque of the automatic transmission; $I_{old}$ characterizes a transmission ratio in the old gear; and, Wv identifies a converter amplification of a torque converter of the automatic transmission determined in each case. The output torque $M_{ab}$ is pregiven by an operator such as the driver of the motor vehicle by positioning the accelerator pedal.

A second interval 2 begins at time point $t_{1h}$ and ends at time point $t_{2h}$ as shown in FIG. 1. The motor rpm $n_{mot}$ begins to drop at time point $t_{2h}$. In this second time interval of the upshift, the motor desired torque is determined according to the relationship:

$$M_{des} = M_{des\ old} + f_1(t)(M_{des\ new} - M_{des\ old})$$

wherein $M_{des\ old}$ is a motor desired torque in the old gear; $M_{des\ new}$ is a motor desired torque in the new gear; and, $f_1(t)$ is a time-dependent function and is especially a characteristic line. FIG. 1 shows a third time interval for the upshifting which starts at time point $t_{2h}$ and ends at time point $t_{3h}$. The time point $t_{3h}$ is coincident with the end of the drop of the motor rpm. This time point lies therefore at that time at which the motor rpm of the new gear is present.

In this third time interval 3 of the upshift operation, the motor desired torque is determined in accordance with the relationship:

$$M_{des} = M_{des\ new} - j\dot{w} f_2(t)$$

wherein $j\dot{w}$ is a moment of inertia of the motor and $f_2(t)$ is a time-dependent function and is especially a characteristic line.

The function $f_2(t)$ is selected in such a manner that the variable $j\dot{w}$, the moment of inertia, can be reduced to approximately the value zero.

According to FIG. 1, a fourth time interval 4 follows directly after the third time interval 3. The fourth time interval 4 begins at time point $t_{3h}$. The start is defined in that the clutch has then reached its synchronous rpm in the new gear.

The motor desired torque is determined in the fourth time interval 4 in accordance with the relationship:

$$M_{des} = \frac{M_{ab}}{I_{new} \cdot Wv}$$

wherein $I_{new}$ is the transmission gear ratio in the new gear.

Figure 3:
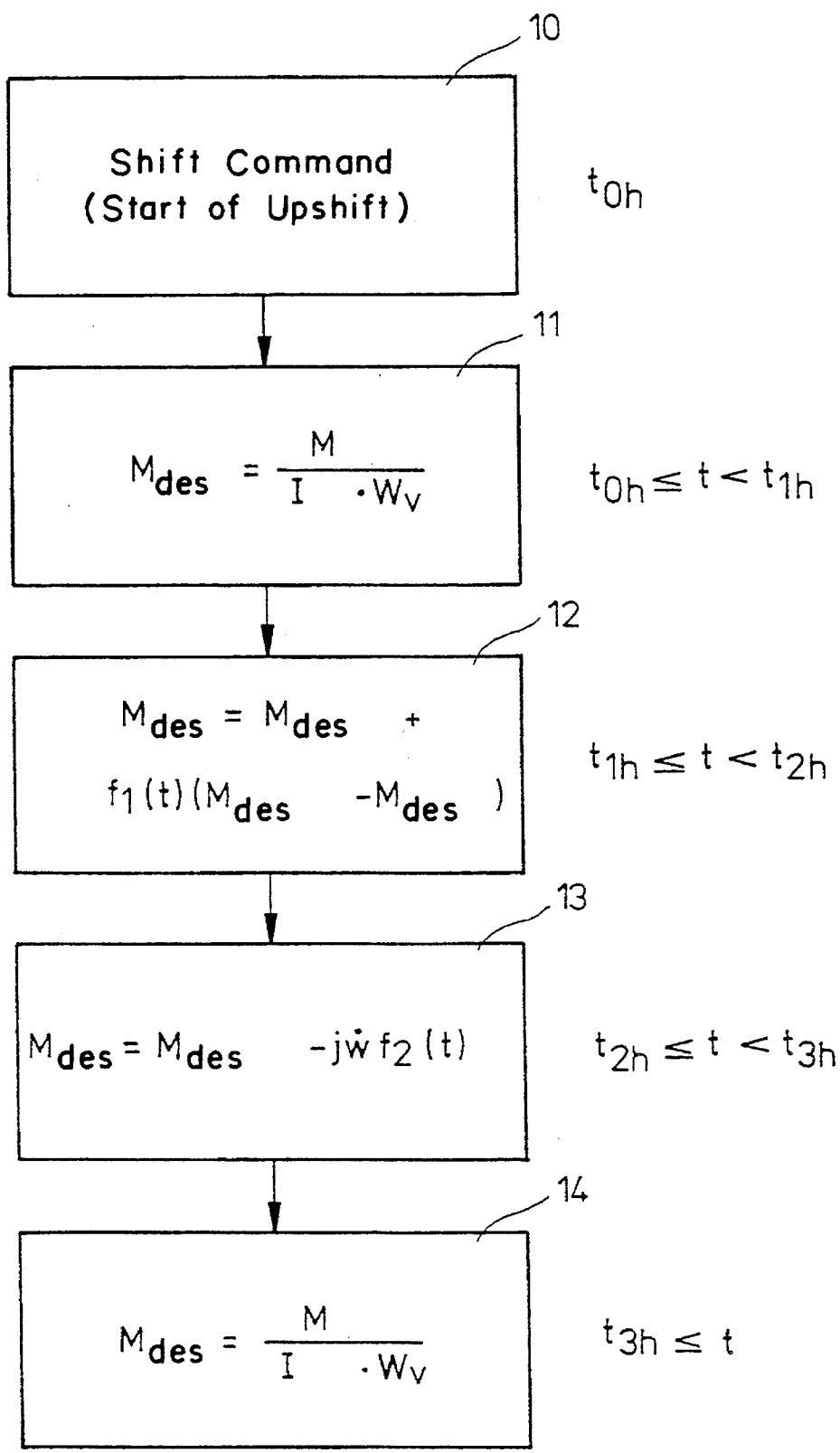
FIG. 3 is a flowchart for upshifting.

FIG. 3 shows a flowchart with blocks 10 to 14. The block 10 embodies the time point $t_{0h}$, that is, the shift command. The block 11 shows the motor desired torque in the time interval 1. Correspondingly, the motor desired torque of the blocks 12, 13 and 14 is there shown for the time intervals 2, 3 and 4. The blocks 10 to 14 concern the upshifting.

Figure 2:
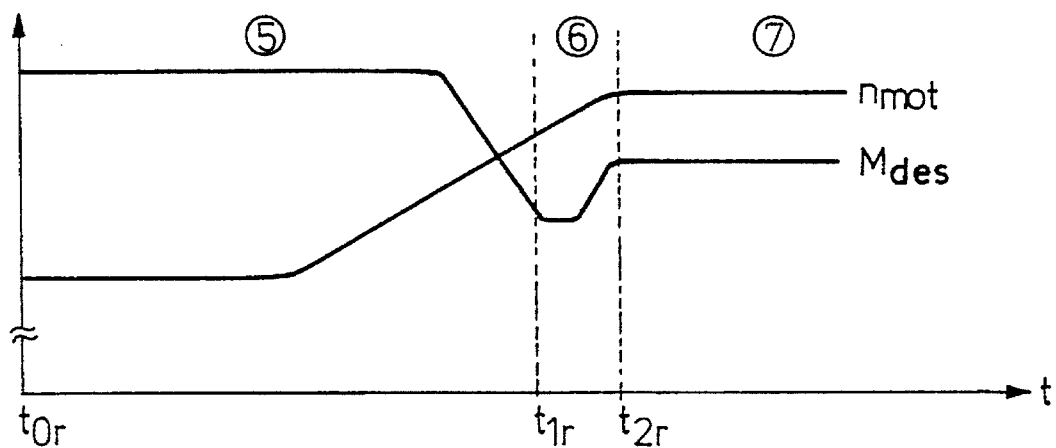
FIG. 2 is a diagram corresponding to that of FIG. 1 but for downshifting.

FIG. 2 shows the downshift operation when the automatic transmission is shifted into a lower gear. Here too, the operation is subdivided into several phases in which the motor desired torque $M_{des}$ is computed according to different criteria in each case.

For downshifting, a fifth time interval 5 is provided which starts at time point $t_{0r}$ and is characterized by the presence of the shift command. The fifth time interval 5 ends at time point $t_{1r}$ at which the motor rpm $n_{mot}$ has already increased. The time point $t_{1r}$ is especially then present when the motor rpm $n_{mot}$ has reached a value which corresponds to the difference of the synchronous rpm of the transmission in the new gear and a characteristic motor rpm or characteristic turbine rpm ($\Delta n$). The characteristic field motor rpm or characteristic field turbine rpm is fixed in a characteristic field.

In the fifth time interval, the motor desired torque for downshifting is determined in FIG. 2 in accordance with the relationship:

$$M_{des} = M_{old}(1 - g_1(t))$$

wherein $g_1(t)$ is a time-dependent function and is especially a characteristic line. The function $g_1(t)$ is preferably such a characteristic line that the variable $M_{des\ old}$ can be reduced to the value zero.

A sixth time interval 6 for the downshifting directly follows the fifth time interval 5. The time interval 6 begins at time point $t_{1r}$ and ends at time point $t_{2r}$. The clutch reaches its synchronous rpm in the new gear at time point $t_{2r}$.

The motor desired torque is determined in this sixth time interval 6 in accordance with the relationship:

$$M_{des} = M_{des\ new}(1-g_2(t))$$

wherein $g_2(t)$ is a time-dependent function (characteristic line). The time-dependent function $g_2(t)$ is selected in such a manner that the variable $M_{des\ new}$ can be reduced to the value zero.

As shown in FIG. 2, a time interval 7 then follows which begins at the time point $t_{2r}$.

In the seventh time interval, the motor desired torque is determined in accordance with the relationship:

$$M_{des} = \frac{M_{ab}}{I_{new} \cdot Wv}$$

Figure 4:
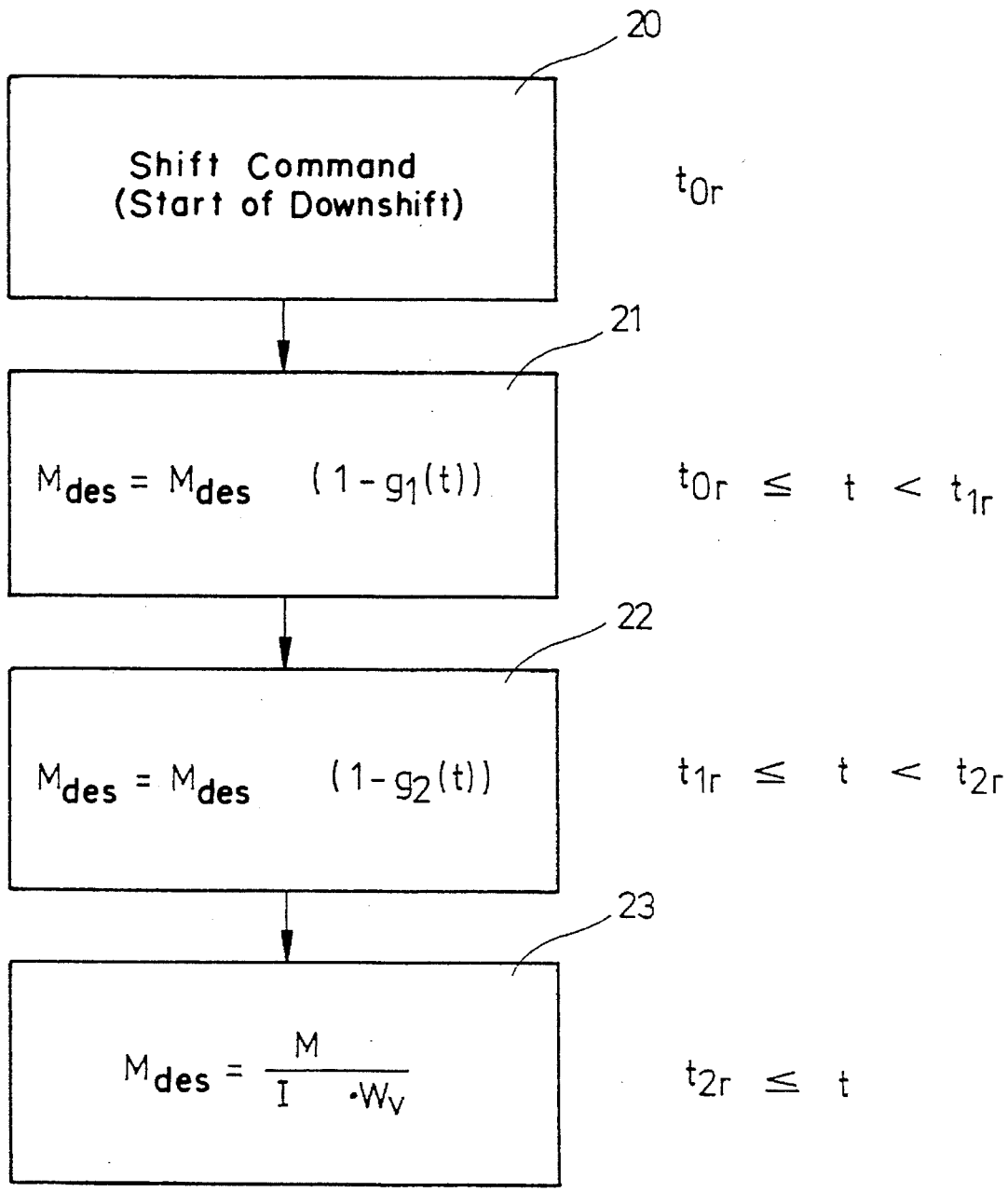
FIG. 4 is a flowchart for downshifting.

The flowchart of FIG. 4 shows the downshifting. The start of the downshift (shift command) is characterized by block 20. The motor desired torque is shown for the time intervals 6 and 7 in the blocks 21, 22 and 23, respectively.

The individual time intervals are again presented in the following in tabular form:
time interval 1: $t_{0h} \leq t < t_{1h}$
time interval 2: $t_{1h} \leq t < t_{2h}$
time interval 3: $t_{2h} \leq t < t_{3h}$
time interval 4: $t_{3h} \leq t$
time interval 5: $t_{0r} \leq t < t_{1r}$
time interval 6: $t_{1r} \leq t < t_{2r}$
time interval 7: $t_{2r} \leq t$ All phases for upshifting and for downshifting (first time interval 1 to seventh time interval 7) have in common that, for the adjustment of the clutch torque at the clutch, the pressure supplied by the pressure controller is computed via a pressure algorithm known per se. However, and according to the invention, a component is applied which defines a torque component. This torque component is the motor desired torque $M_{des}$ which is determined in the various time intervals in accordance with the particular relationships given.

Figure 5:
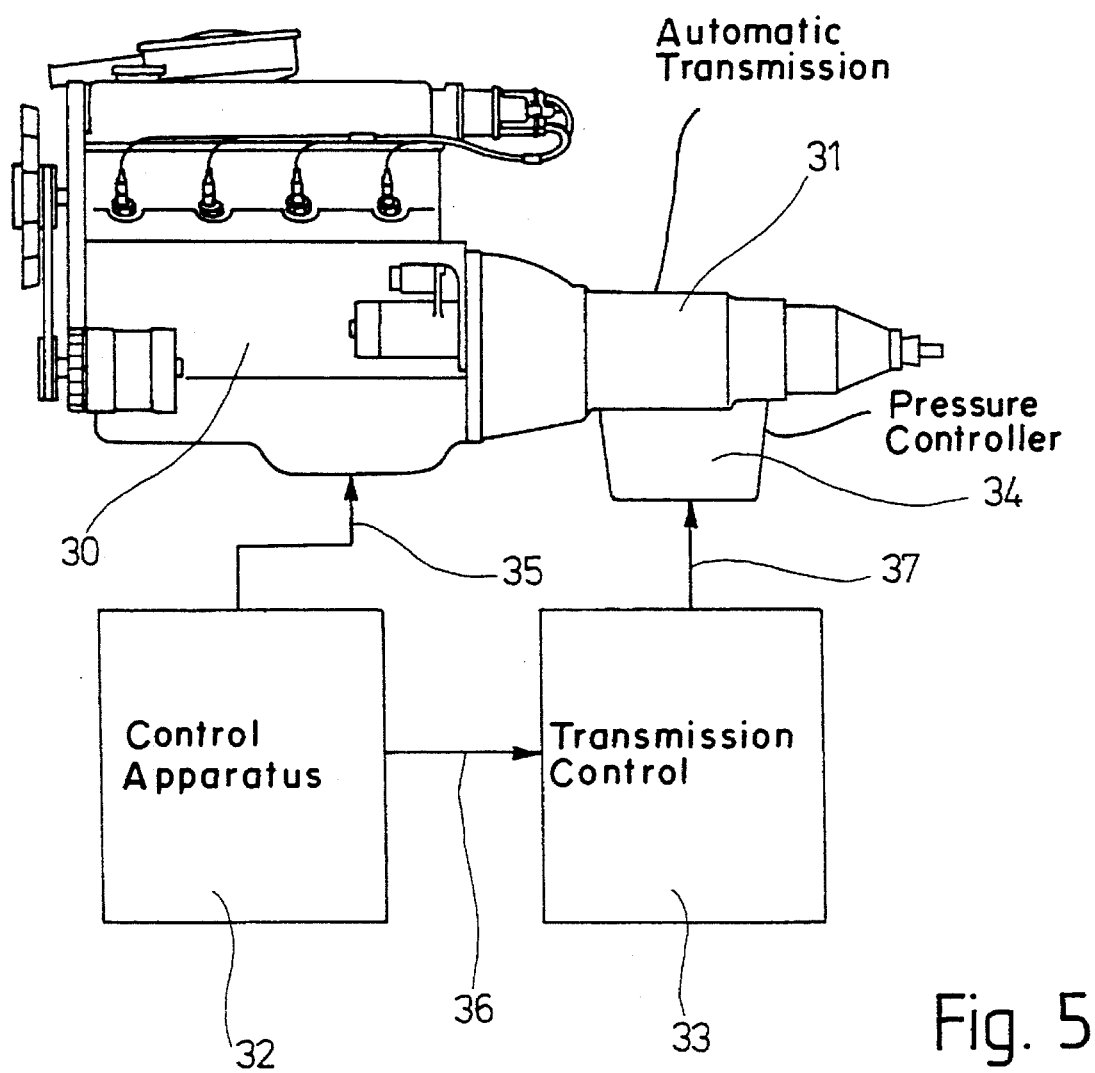
FIG. 5 is a block circuit diagram of a motor/transmission unit of a motor vehicle.

The block circuit diagram of FIG. 5 shows a motor 30 of a motor vehicle (not shown) which coacts with an automatic transmission 31. An electronic control device 32 is assigned to the motor and a transmission control 33 is assigned to the automatic transmission 31. The automatic transmission 31 includes a pressure controller 34. The control device 32 is connected to the motor 30 via connection 35 and is connected to the transmission control 33 via the connection 36. The transmission control 33 is connected to the pressure controller 34 via connection 37. An exchange of data takes place via these connections 35, 36 and 37 and control functions are performed. In the control device 32, a motor desired torque is generated as an electrical variable from different parameters of the motor/transmission unit shown in FIG. 5. This electrical variable is supplied to the transmission control 33. The transmission control 33 processes the data and controls the pressure controller 34 via the connection 37 in such a manner that a clutch of the automatic transmission 31 is controlled in dependence upon the motor desired torque.

A piecewise computed trace of the motor desired torque $M_{des}$ is effective in accordance with the invention during the shift of the automatic transmission whereby a high level of comfort is obtained and the complexity of the application is reduced. An increase of the motor torque takes place during the shifting operation in dependence upon the shift trace. A torque constant on the drive axis can be provided during the shift operation.

It is understood that the foregoing description is that of the preferred embodiments of the invention and that various changes and modifications may be made thereto without departing from the spirit and scope of the invention as defined in the appended claims.

What is claimed is:

1. A method for adjusting a hydraulic pressure actuating at least one clutch of an automatic transmission during a gear change, the automatic transmission having a pressure controller and coacting with a motor such as the drive motor of a motor vehicle, the method comprising the step of determining the pressure to be supplied by said pressure controller in dependence upon a pregiven motor desired torque ($M_{des}$).

2. The method of claim 1, wherein said automatic transmission includes a clutch for developing a clutch torque and said automatic transmission is part of a drive/transmission-train; and, said method comprising the further step of determining the pressure supplied by said pressure controller in dependence upon several operating parameters of the drive/transmission-train for adjusting the clutch torque of said clutch and one of said operating parameters being a torque parameter.

3. The method of claim 1, comprising the further step of computing said motor desired torque ($M_{des}$) for different time intervals according to various criteria when said transmission is upshifted and/or downshifted.

4. The method of claim 1, comprising the further step of distinguishing the following time interval when upshifting, namely, a first time interval beginning at a first time point characterizing a shift command and ending at a second time point at which the motor rpm ($n_{mot}$) has not yet dropped.

5. The method of claim 4, wherein a second time interval of upshifting begins at said second time point and ends at a third time point at which the motor rpm ($n_{mot}$) begins to drop.

6. The method of claim 5, comprising the further step of distinguishing a third time interval when upshifting which begins at said third time point and ends at a fourth time point at which time the drop of the motor rpm ($n_{mot}$) stops and said motor rpm ($n_{mot}$) corresponds to the motor rpm ($n_{mot}$) of the new gear.

7. The method of claim 6, comprising the further step of distinguishing a fourth time interval when upshifting which begins at said fourth time point at which time said clutch reaches its synchronous rpm in the new gear.

8. The method of claim 7, wherein said automatic transmission includes a torque converter and said method comprising the further step of determining the motor desired torque in said first time interval according to the relationship:

$$M_{des} = \frac{M_{ab}}{I_{old} \cdot Wv}$$

wherein: $M_{ab}$ is an output torque of the automatic transmission, $I_{old}$ is a transmission ratio in a previous gear of said automatic transmission and Wv is a converter amplification determined for each case of said torque converter.

9. The method of claim 8, comprising the further step of presetting said output torque ($M_{ab}$) by an operator, such as the driver, of said motor vehicle.

10. The method of claim 9 wherein said output torque is preset by the position of the accelerator pedal.

11. The method of claim 9, comprising the further step of determining the motor desired torque in said second interval of the upshifting according to the relationship $$M_{des} = M_{des\ old} + f_1(t)(M_{des\ new} - M_{des\ old})$$

wherein: $M_{des\ old}$ is a motor desired torque in the old gear; $M_{des\ new}$ is a motor desired torque in the new gear; and, $f_1(t)$ is a time-dependent function.

12. The method of claim 11, comprising the further step of determining the motor desired torque in the third interval of the upshifting according to the relationship:

$$M_{des} = M_{des\ new} - j\dot{w} f_2(t)$$

wherein: $j\dot{w}$ is a moment of inertia of the motor and $f_2(t)$ is a time-dependent function.

13. The method of claim 12, comprising the further step of selecting the function $f_2(t)$ in such a manner that the variable $j\dot{w}$ can be reduced to the value zero.

14. The method of claim 13, comprising the further step of determining the motor desired torque in said fourth time interval of the upshifting according to the relationship:

$$M_{des} = \frac{M_{ab}}{I_{new} \cdot Wv}$$

wherein $I_{new}$ is the transmission ratio in the new gear.

15. The method of claim 14, comprising the further step of distinguishing the following time interval when downshifting, namely, a fifth time interval beginning at a fifth time point characterizing the shift command and ending at a sixth time point at which the motor rpm ($n_{mot}$) has already increased.

16. The method of claim 15, wherein said sixth time point is present when the motor rpm ($n_{mot}$) has reached a value which corresponds to the difference of the synchronous rpm of the transmission in the new gear and a motor rpm defined by a characteristic field or a turbine rpm defined by a characteristic field.

17. The method of claim 16, wherein a sixth time interval of downshifting begins at said sixth time point and ends at a seventh time point at which the clutch has reached its synchronous rpm in the new gear.

18. The method of claim 17, wherein a seventh time interval when downshifting begins at said seventh time point.

19. The method of claim 18, wherein the motor desired torque is determined in the fifth time interval when downshifting according to the relationship:

$$M_{des} = M_{des\ old}(1 - g_1(t))$$

wherein $g_1(t)$ is a time-dependent function (characteristic line).

20. The method of claim 19, comprising the further step of selecting the function $g_1(t)$ in such a manner that the variable $M_{des\ old}$ can be reduced to the value zero.

21. The method of claim 20, comprising the further step of determining the motor desired torque in the sixth time interval when downshifting according to the relationship:

$$M_{des} = M_{des\ new}(1 - g_2(t))$$

wherein $g_2(t)$ is a time-dependent function (characteristic line).

22. The method of claim 21, comprising the further step of selecting the function $g_2(t)$ in such a manner that the variable $M_{des\ new}$ can be reduced to the value zero.

23. The method of claim 22, comprising the further step of determining the motor desired torque in the seventh time interval when downshifting according to the relationship:

$$M_{des} = \frac{M_{ab}}{I_{new} \cdot Wv}.$$

* * * * *